2 Sheets--Sheet 1.

J. G. SMITH.
Machines for Coiling Wire.

No. 153,388. Patented July 21, 1874.

ATTEST:
Robert Burns.
Walter Allen

INVENTOR:
John G. Smith
By Knight Bros.
Attys.

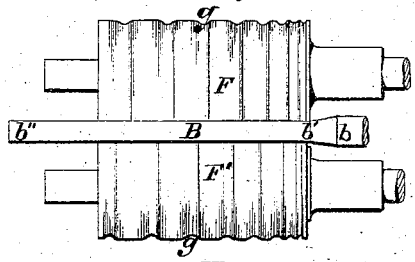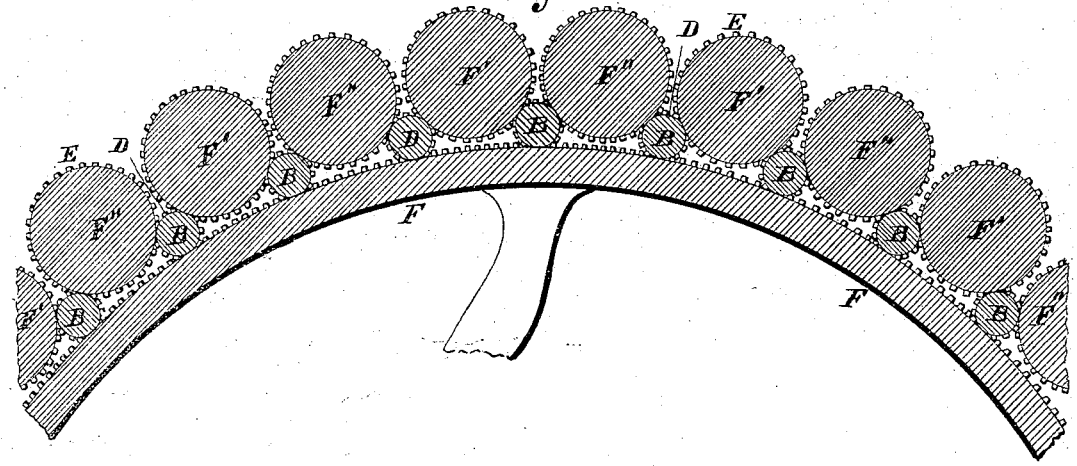

UNITED STATES PATENT OFFICE.

JOHN G. SMITH, OF ST. LOUIS, MISSOURI.

IMPROVEMENT IN MACHINES FOR COILING WIRE.

Specification forming part of Letters Patent No. 153,388, dated July 21, 1874; application filed November 14, 1873.

CASE A.

*To all whom it may concern:*

Be it known that I, JOHN G. SMITH, of St. Louis, St. Louis county, Missouri, have invented a Machine for Coiling Wire, of which the following is a specification:

The first part of this invention consists in giving to the spindle around which the wire is coiled a tapering form, and combining with three rollers which taper in the opposite direction, so that the surfaces of the spindle and surrounding rollers shall be in contact or equidistant from end to end. The second part of my invention consists in forming the aforesaid rollers with grooves, whose distance apart gradually increases toward the larger end, (that is, toward the smaller end of the spindle,) so that the spiral shall be drawn longitudinally at that end, to hold it in close contact with the part of the spindle having a decreased diameter, as more fully described hereafter.

Figure 1:
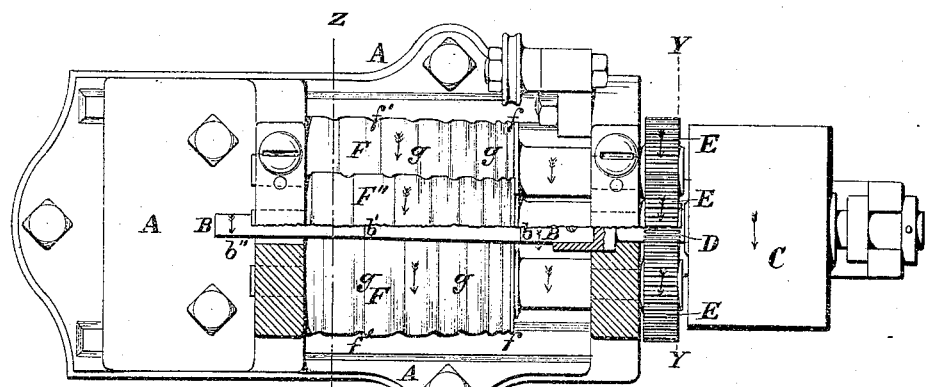
Figure 2:
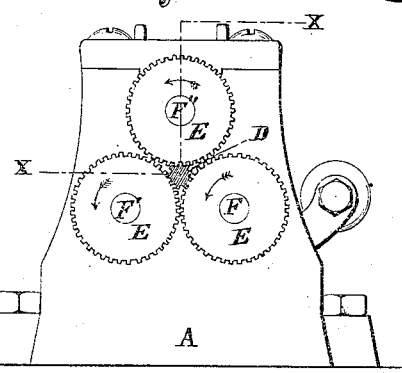
Figure 3:
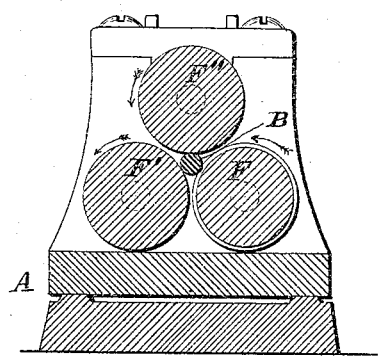
Figure 4:
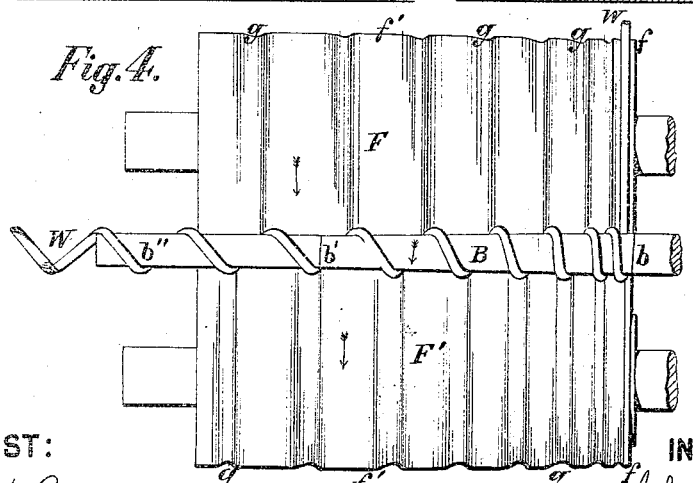

In the drawings, Figure 1 shows my improvement one-half in top view and one-half in horizontal section at the line X X, Fig. 2. Fig. 2 is a transverse section at Y Y, Fig. 1. Fig. 3 is a transverse section at Z Z, Fig. 1. Fig. 4 is an enlarged top view of the spindle and the two lower rollers, the upper roller being removed to show the course of the wire. Fig. 5 is a top view, and Fig. 6 a sectional view, showing modifications of my improvement.

A is the head, which may be supported on any suitable frame or table. The spindle and rollers have bearing in the head, as shown. B is the spindle, around which the coil is made. This spindle is made tapering from $b$ to $b'$, to ease the longitudinal slip of the coil upon it, the coil or spiral being made upon the part between these points; but from these points to the ends the spindle may be cylindriform. Upon the larger end of the spindle B is a driving-pulley, C, to receive the belt, which belt admits of being rapidly thrown into or out of motion, to put the spindle and rollers in action, or to stop their rotation. D is a pinion, engaging the spur-wheels E upon the rollers F F' F'', which surround the spindle. These rollers receive rotation by means of the spur-wheels D and E, and these spur-wheels are made of such relative size as to give to the spindle and rollers about the same surface speed. The rotation is indicated by arrows.

The spindle is made tapering or of decreasing diameter from $b$ to $b'$; and as it is requisite that the rollers and spindle should be in contact (or at least equidistant) from end to end, the rollers F F' F'' are made somewhat of frusto-conical form, increasing in diameter from $f$ to $f'$ to accomplish the above requirement.

It will be obvious that, as the coil of wire decreases in diameter as it is moved along toward the smaller end of the spindle, the coil would become loose on the spindle unless its speed in a rotatory direction were somewhat accelerated, or it were attenuated longitudinally, so that each circlet of the coil should contain an equal length of wire, whether upon the larger or smaller part of the spindle. To accomplish this result the circumferential grooves $g$ in the rollers are placed at increasing distances apart toward the larger ends of the rollers F F' F''.

The operation of my improvement is as follows: The wire W runs into the machine over the roller F in one of the grooves $g$, as shown in Fig. 4, and passing beneath the spindle B, and between the spindle and the roller F', extends upward and beneath the roller F'', and so on down into the next groove $g$ in the first roller F, where it acquires a slightly spiral form. The wire is thus carried around and around the spindle, and guided by the grooves $g$, and the spiral gradually drawn out, as shown, until it reaches the point $f'$, where it escapes from the action of the rollers F F' F'', and is thrown off at the end $b''$ of the spindle.

In Fig. 5 (illustrating a modification) is shown in top view the two under rollers and the spindle. In this modification the rollers are not made tapering, and the part of the spindle in contact with the rollers is also cylindrical; but at $b$ the spindle has a conical portion, around which the wire may take one turn before passing between the spindle and the rollers.

In Fig. 6 is shown in section transverse to the spindles B a single large cylinder, F, surrounded by a number of spindles, with which it engages by spur-gear. Outside is a circular series of rollers, F', which are driven by the spur-gears of the spindles, as shown. The cylinder F and rollers F' have grooves $g$, similar to those before described, and act on the wire in a similar manner.

I claim as new and of my invention—

1. The spindle B, having a tapering portion from $b$ to $b'$, in combination with the grooved rollers, tapering from $f'$ to $f$, substantially as and for the purpose set forth.

2. The combination of the smooth tapering spindle B with the tapering rollers F F' F", when the latter are provided with grooves $g$, increasing in distance asunder toward the larger end, substantially as and for the purpose set forth.

JOHN G. SMITH.

Witnesses:
JOHN W. BOSHFORD,
FRANK KESSENICH.